(12) United States Patent
Kawachi et al.

(10) Patent No.: US 6,863,441 B2
(45) Date of Patent: Mar. 8, 2005

(54) SLIDING MEMBER

(75) Inventors: Toshiaki Kawachi, Nagoya (JP); Hideo Ishikawa, Nagoya (JP); Masaaki Sakamoto, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 156 days.

(21) Appl. No.: 10/238,535

(22) Filed: Sep. 10, 2002

(65) Prior Publication Data
US 2003/0048961 A1 Mar. 13, 2003

(30) Foreign Application Priority Data
Sep. 10, 2001 (JP) ........................................ 2001-273092

(51) Int. Cl.$^7$ ............................................... F16C 33/06
(52) U.S. Cl. ........................ 384/276; 387/42; 387/912
(58) Field of Search ................................ 384/276, 280, 384/912, 42, 294

(56) References Cited

U.S. PATENT DOCUMENTS

2003/0095731 A1 * 5/2003 Kawachi et al. ............ 384/276

FOREIGN PATENT DOCUMENTS

| DE | 575926 | 5/1933 |
|----|--------|--------|
| DE | 967458 | 11/1957 |
| DE | 969139 | 5/1958 |
| DE | 1067919 | 10/1959 |
| DE | 1128672 | 4/1962 |
| GB | 2 060 692 A | 5/1981 |
| GB | 2 260 338 A | 4/1993 |
| GB | 2 270 927 A | 3/1994 |
| GB | 2 277 935 A | 11/1994 |
| GB | 2 355 016 A | 4/2001 |
| JP | 56051589 A | 5/1981 |
| JP | 61079023 A | 4/1986 |
| JP | 11-050296 A | 2/1999 |
| JP | 2003-156046 A | 5/2003 |

OTHER PUBLICATIONS

Japanese Abstract 2001–020955 published Jan. 23, 2001.
International Search and Examination Report for UK application No. GB0404306.3 dated Apr. 7, 2002.
International Search and Examination Report for UK application No. GB0404305.5 dated Apr. 7, 2002.

* cited by examiner

Primary Examiner—Lenard A. Footland
(74) Attorney, Agent, or Firm—Rader, Fishman & Grauer PLLC

(57) ABSTRACT

There is provided a sliding member comprising a bearing alloy layer and an overlay layer bonded to the bearing alloy layer which overlay layer is made of Bi having a crystal grain density of 50 to 300 pieces/100 $\mu m^2$. The overlay layer may be made of a Bi-base alloy containing Cu or Ag. The sliding member further comprises a conforming layer provided on the overlay layer in a case where the overlay layer is made of the Bi-based alloy.

8 Claims, 1 Drawing Sheet

SLIDING MEMBER

BACKGROUND OF THE INVENTION

The present invention relates to a sliding member comprising an overlay layer made of Bi (bismuth) or a Bi alloy.

In an internal combustion engine used in an automobile etc. are used sliding bearings in each of which a Cu-based or Al-based bearing alloy is used and on the surface of each of which an overlay layer is usually provided to enhance the conformability thereof. Hitherto, as the material of the overlay layer, a Pb alloy has been used which is soft in hardness, or a Sn alloy has been used in some cases.

Since Pb is a substance causing environmental pollution, it is desired to cease the use thereof, and various researches have been performed for ceasing the use of Pb. For example, in JP-A-2001-20955, it is disclosed to use Bi instead of the use of Pb.

However, since Bi is brittle and is inferior regarding anti-seizure property, Bi is not suitable as the material of the overlay layer which is required to have good fatigue resistance and good conformability. Thus, in a case of using Bi as the material of the overlay layer, it is necessary to improve such properties of Bi as to be brittle and inferior in the anti-seizure property, so that the overlay layer made of a material containing Bi may be practically usable.

SUMMARY OF THE INVENTION

The object of the invention is to provide a sliding member provided with an overlay layer made of a material containing Bi in which overlay layer such properties of Bi as to be brittle and inferior in anti-seizure property are improved.

According to the first aspect of the invention, there is provided a sliding member comprising a bearing alloy layer and an overlay layer bonded to the bearing alloy layer which overlay layer is made of Bi having a crystal grain density of 50 to 300 pieces/100 $\mu m^2$.

After elaborate researches, the inventors have discovered that, in a case of providing the overlay layer by use of pure Bi (, that is, commercially available, pure Bi), it becomes possible to provide the overlay layer superior in fatigue resistance and in conformability by limiting the density of the crystal grains of Bi into a range of 50 to 300 pieces per 100 $\mu m^2$.

In a case where the density of Bi grains is less than 50 pieces/100 $\mu m^2$, a problem occurs in that an insufficient oil film occurs due to the influence of coarse Bi grains, so that the overlay layer becomes inferior in anti-seizure property and in fatigue resistance. On the other hand, in another case where the density of Bi grains exceeds 300 pieces/100 $\mu m^2$, the relative surface area of the overlay layer becomes small, so that the oil-retention property thereof is deteriorated with the anti-seizure property thereof being also deteriorated. In order to improve the conformability of the overlay layer made of Bi, the density of Bi grains is limited to be in the range of 50 to 300 pieces/100 $\mu m^2$.

As a process for providing the overlay layer having the above-explained density of Bi grains, there is used a process of periodic reverse electroplating (PR electroplating), in which process a plating treatment is performed while periodically switching a cathode current into an anode current and vice versa so that the time of the anode current may become about 10 to about 20 percents of the time of the cathode current. The longer the time of the anode current is, the better the leveling effect of the PR electroplating becomes. However, since the plated Bi comes to be dissolved in the time of the anode current, the operation rate of the PR electroplating becomes slow. The density of the Bi grains occurring during the PR electroplating can be controlled by adjusting the value of the anode current, the value of the cathode current, the times of the anode and/or cathode current, and/or the cycle of the switching thereof.

By performing the plating of Bi through the PR electroplating process, there are deposited Bi crystal grains in a dense state each of which grains has a shape of tetrahedron schematically shown in FIG. 1, so that the surface of the overlay layer made of the deposited Bi grains becomes to have many fine irregularities contributing the increase of relative surface area and wettability with the result that it becomes possible for the overlay layer to hold a much amount of lubricant. In a case where a much amount of lubricant is present on the sliding face, the sliding member comes to have a good anti-seizure property even if the sliding member is used under a high specific load.

According to the second aspect of the invention, there is provided a sliding member comprising a bearing alloy layer and an overlay layer bonded to the bearing alloy layer which overlay layer is made of Bi-based alloy consisting of 0.1 to 10 mass % Cu and the balance Bi.

The inventors of the present invention have also found that, by alloying Bi for densifying the crystal structure of the overlay layer, it becomes possible to improve such properties of Bi as to be brittle and inferior in anti-seizure property. In alloying Bi, various additive elements are conceivable. In general, by alloying a metal, the melting point of the metal is lowered. For example, by adding In and/or Sn in Bi, the melting point of a resultant Bi-based alloy is lowered, so that the anti-seizure property of the overlay layer made of this Bi-based alloy is deteriorated very much. After the intensive research performed by the inventors, they have found that, by adding Cu in Bi, the crystal structure of the overlay layer can be densified without lowering the melting point of a resultant Bi-based alloy, that in a case where the adding amount of Cu is less than 0.1 mass %, it is impossible to obtain the intended densifying of the crystal structure, and that in another case where the adding amount of Cu is more than 10 mass %, the resultant Bi-based alloy becomes too hard and too brittle to be used as the overlay layer.

According to the third aspect of the invention, a conforming layer made of Bi having a crystal grain density of 50 to 300 pieces/100 $\mu m^2$ may be provided on the Bi—Cu alloy overlay layer.

The Bi—Cu alloy is hard in hardness (about 30 Hv), however, pure Bi is relatively soft in hardness (about 15 Hv). Thus, by providing the conforming layer made of pure Bi on the overlay layer, it becomes possible to enhance the anti-seizure property and conformability of a resultant sliding member. The thickness of the conforming layer is preferably in the range of 0.1 to 5 $\mu m$.

According to the fourth aspect of the invention, there is provided a sliding member comprising a bearing alloy layer, an overlay layer bonded to the bearing alloy layer which overlay layer is made of a Bi-based alloy consisting of not less than 0.1 mass % Ag and the balance Bi, and a conforming layer bonded to the overlay layer which conforming layer is made of Bi having a crystal grain density of 50 to 300 pieces/100 $\mu^2$.

The inventors have found that, by using as the material of the overlay layer the Bi-based alloy containing Ag and by providing a conforming layer of pure Bi on the overlay layer, it is also possible to densify the crystal structure of the overlay layer and to improve such properties of Bi as to be brittle and inferior in anti-seizure property, without lowering the melting point of Bi. The amount of Ag added to Bi is limited to be not less than 0.1%. In a case where the adding amount of Ag is less than 0.1, no densified crystal structure is obtained regarding the overlay layer. It is preferred for Ag to be added in Bi by the amount of 0.1 to 10 mass %. In another case where the amount of Ag is more than 10 mass %, the overlay layer becomes hard in hardness and becomes somewhat brittle, however, no serious problem occurs even in a case of more than 10 mass % Ag being added to Bi because the conforming layer of pure Bi is provided on the overlay layer, and the upper limit of the amount of Ag is 20 mass %.

According to the fifth aspect of the invention, it is preferred that an intermediate layer is provided between the bearing alloy layer and the overlay layer so that the bonding strength achieved between the overlay layer and the bearing alloy layer may be enhanced. The intermediate layer is preferably made of a metal selected from the group consisting of Ni, Co, Fe, Ag, Cu and an alloy containing as the main constituent thereof this metal. The thickness of the intermediate layer is in the range of 0.5 to 8 $\mu$m, and the thickness of the overlay layer is in the range of 5 to 15 $\mu$m and is preferably about 15 $\mu$m. In the case of providing the conforming layer, the thickness of the conforming layer is preferably in the range of 0.1 to 5 $\mu$m.

In a case where the intermediate layer is made of Sn or a Sn alloy, Sn acts to diffuse in Bi to thereby generate a compound with the result that the bonding between the intermediate layer and the overlay layer being achieved by diffusion bonding, that is, the bonding is achieved by the compound of Bi and Sn occurring by the diffusion. However, since the melting point of the compound occurring by the diffusion is low and since the grains of the compound grow during the use of the sliding member due to a high temperature of about one hundred and several tens ° C. occurring at the bearing face of the sliding member, there occurs such a problem as the peeling-off of the overlay layer is apt to occur.

On the other hand, in the case of the invention, each of Cu and Ag which forms the intermediate layer is bonded to Bi by so-called "metallic bond", and the bonding of the overlay is achieved by the metallic bond, so that no peeling-off of the overlay layer is caused during the use of the sliding member at a high temperature. Thus, the sliding member of the invention is superior in bonding and the fatigue resistance of the overlay layer is enhanced. In a case where the intermediate layer is made of Ni or Co or Fe or the alloy thereof, the bonding strength of the overlay layer becomes similar to that of Ag or Cu or the alloy thereof of which the intermediate layer is made.

As regards the bearing alloy layer, it may be made of a Cu alloy or an Al alloy.

DESCRIPTION OF THE PREFERRED EMBODIMENTS

The embodiments of the invention are described below.

Figure 1:
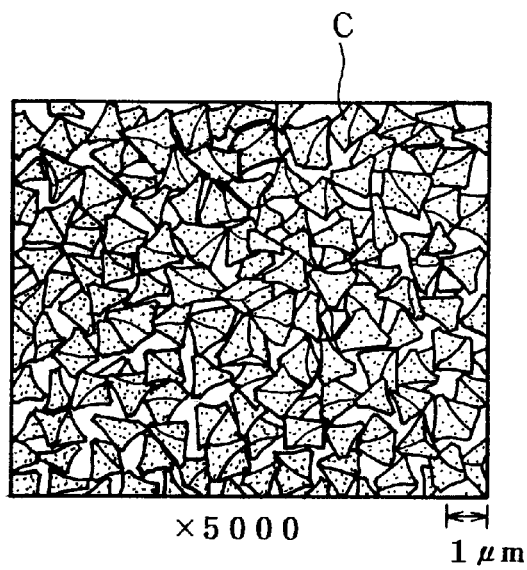
FIG. 1 is a schematic view prepared from the microscopic photograph of an overlay relating to the invention, which schematic view shows the crystal grain density of about 110 pieces/100 $\mu$m$^2$.
Figure 2:
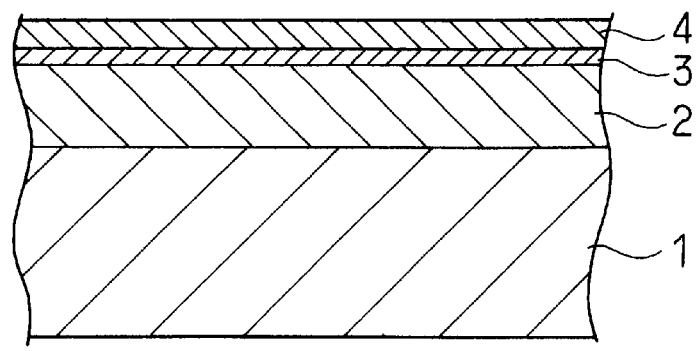
FIG. 2 is a partial, sectional view of a sliding member embodying the invention.

Plain bearing samples Nos. 1 to 5 embodying the invention each of which had a structure shown in FIG. 2 and comparative plain bearing samples Nos. 1 to 3, all of which are shown in Table 1, were produced through a method comprising the steps of: providing a bearing alloy layer 2 of a Cu alloy or an Al alloy on a back metal layer 1 of a steel; providing an intermediate layer 3 on the bearing alloy layer 2 by a plating process; and providing an overlay layer 4 on the intermediate layer 3 by another plating process. Samples Nos. 6 and 7 embodying the invention were produced by providing a conforming layer (not shown) on an overlay layer 4 after providing through an intermediate layer 3 the overlay layer 4 on a bearing alloy layer 2 bonded onto a back metal layer 1. In table 1, a numerical value shown before each of some of the atomic symbols indicates the contents (mass %) of the element, and the numerical value in the column of the density of the deposited grains of Bi regarding each of the samples Nos. 6 and 7 is a density of deposited grains of Bi of which the conforming layer is made.

Each of the overlay layer 4 and the conforming layer was provided by a PR electroplating method, and the density of the deposited grains of Bi (commercially available pure Bi)or Bi-based alloys were adjusted by varying the operating conditions of the PR electroplating method. In the PR (periodic reverse) electroplating method was used the apparatus of "HOKUTO DENKO PULSE PLATING POWER SOURCE HPC-301H" produced by Hokuto Denko Company Ltd., in which PR electroplating method the conditions of the pulse plating were 2 to 10 A/dm$^2$ at the side of the positive electrode for a time of 0.001 to 0.1 second and –0.1 to –0.01 A/dm$^2$ at the side of the negative electrode for a time of 0.0001 to 0.001 second. The intermediate layer of Ag, Cu or Cu-5Zn was provided in a plating bath containing cyanogen at a bath temperature of 35 to 45° C. through a plating current of 1 to 3 A/dm$^2$, and the plating of Bi, Bi—Cu or Bi—Ag was performed by use of the PR electroplating method in a methanesulfonic acid bath at a bath temperature of 35 to 45° C. In the present specification, the technical term, "the density of crystal grains" or "the density of grains" is defined to be a density of crystal grains present in a area of 100 $\mu$m$^2$ of the overlay layer or the conforming layer when viewed the overlay layer or the conforming layer through a secondary electron beam image of 5000 times obtained by a scanning electron microscope (SEM).

Regarding each of the samples thus prepared was performed a fatigue test, the result of which is shown in Table 1. In the fatigue test was used a sapphire testing machine under the following testing conditions:

The inner diameter of the bearing - - - 53 mm;

The width of the bearing - - - 16 mm;

Revolution of a shaft - - - 3650 rpm;

Material of the shaft - - - S55C;

Lubricant - - - VG 22; and

Time of test - - - 20 hours.

TABLE 1

|  | sample No. | bearing alloy | intermediate layer | overlay layer composition | Bi grain* density (pieces/100 μm²) | maximum specific load at which no seizure occurs (MPa) |
|---|---|---|---|---|---|---|
| Inventive Products | 1 | Cu alloy | Ag | Bi | 50 | 85 |
|  | 2 | Al alloy | Cu-5Zn | Bi-5Cu | 30 | 85 |
|  | 3 | Al alloy | Ag | Bi-0.5Cu | 100 | 90 |
|  | 4 | Al alloy | Cu | Bi | 180 | 100 |
|  | 5 | Cu alloy | Cu-5Zn | Bi-1Cu | 200 | 100 |
|  | 6 | Cu alloy | Ag | conforming layer of Bi/Bi-5Cu | 150 | 90 |
|  | 7 | Cu alloy | Ag | conforming layer of Bi/Bi-5Ag | 150 | 90 |
| Comparative Products | 1 | Cu alloy | Cu-5Zn | Bi | 35 | 65 |
|  | 2 | Cu alloy | Ag | Bi-15Cu | 350 | 70 |
|  | 3 | Al alloy | Cu | Bi | 370 | 60 |

*The term "Bi grain" used herein means one containing the dissolved additive and/or precipitates as well as pure Bi grain.

From Table 1, it is apparent that in each of the comparative samples Nos. 1 to 3, the maximum specific load at which no fatigue occurs is not more than 70 MPa, however, in each of the inventive samples Nos. 1 to 7, the maximum specific load at which no fatigue occurs is not less than 85 MPa, that is, the inventive samples are superior to the comparative samples regarding the fatigue resistance.

Namely, although in each of the inventive samples Nos. 1 and 4 and the comparative sample No. 1, the overlay layer is made of pure Bi, the deposited grain densities of the inventive samples are 50 pieces/100 μm² and 180 pieces/100 μm², respectively, with the deposited grain densities of the comparative sample being 35 pieces/100 μm², whereby the inventive samples Nos. 1 and 4 are superior to the comparative sample regarding the fatigue resistance.

Further, in each of the inventive samples Nos. 2, 3 and 5 and the comparative sample No. 2 the overlay layer is made of the Bi alloy containing Cu, however, the overlay layers of the inventive samples Nos. 2, 3 and 5 contain respectively Cu contents of 5 mass %, 0.5 mass % and 1 mass %, so that the inventive samples are superior regarding the fatigue resistance to the comparative sample No. 2 having the overlay layer containing 15 mass % Cu.

In the inventive samples Nos. 6 and 7 in each of which the conforming layer of pure Bi (, that is, commercially available pure Bi) is provided on the overlay layer made of the Bi-based alloy containing Cu or Ag, the fatigue resistance thereof becomes superior because of the deposited Bi grain density of 150 pieces/100 μm² regarding the conforming layer.

Thus, in a case where the overlay layer is made of the Bi-based alloy containing 0.1 to 10 mass % Cu or in another case where the overlay layer formed of the pure Bi is made to have the grain density of 50 to 300 pieces/100 μm² or in still another case where the overlay layer formed of the Bi-based alloy containing Ag is made to have on the surface thereof the conforming layer of the pure Bi having the grain density of 50 to 300 pieces/100 μm², it becomes possible to obtain the sliding member having superior conformability, anti-seizure property and enhanced fatigue resistance.

The sliding member of the invention is preferably used as a plain bearing for an internal combustion engine, however, the usage of the sliding member of the invention is not limited to this plain bearing.

What is claimed is:

1. A sliding member comprising a bearing alloy layer and an overlay layer bonded to the bearing alloy layer which overlay layer is made of Bi having a crystal grain density of 50 to 300 pieces/100 μm².

2. A sliding member according to claim 1, wherein the overlay layer is bonded to the bearing alloy layer through an intermediate layer located between the overlay layer and the bearing alloy layer, said intermediate layer being made of a metal selected from the group consisting of Ni, Co, Fe, Ag, Cu and an alloy thereof.

3. A sliding member comprising a bearing alloy layer and an overlay layer bonded to the bearing alloy layer which overlay layer is made of Bi-based alloy consisting of 0.1 to 10 mass % Cu and the balance Bi.

4. A sliding member according to claim 3, wherein the overlay layer is bonded to the bearing alloy layer through an intermediate layer located between the overlay layer and the bearing alloy layer, said intermediate layer being made of a metal selected from the group consisting of Ni, Co, Fe, Ag, Cu and an alloy thereof.

5. A sliding member according to claim 3, further comprising a conforming layer bonded to the overlay layer which conforming layer is made of Bi having a crystal grain density of 50 to 300 pieces/100 μm².

6. A sliding member according to claim 5, wherein the overlay layer is bonded to the bearing alloy layer through an intermediate layer located between the overlay layer and the bearing alloy layer, said intermediate layer being made of a metal selected from the group consisting of Ni, Co, Fe, Ag, Cu and an alloy thereof.

7. A sliding member comprising a bearing alloy layer, an overlay layer bonded to the bearing alloy layer which overlay layer is made of Bi-based alloy consisting of not less than 0.1 mass % Ag and the balance Bi, and a conforming layer bonded to the overlay layer which conforming layer is made of Bi having a crystal grain density of 50 to 300 pieces/100 μm².

8. A sliding member according to claim 7, wherein the overlay layer is bonded to the bearing alloy layer through an intermediate layer located between the overlay layer and the bearing alloy layer, said intermediate layer being made of a metal selected from the group consisting of Ni, Co, Fe, Ag, Cu and an alloy thereof.

* * * * *